United States Patent [19]

Pöll et al.

[11] 4,427,733

[45] Jan. 24, 1984

[54] SMALL DECORATIVE PLATES

[75] Inventors: Martin Pöll, Fritzens; Christian Covi, Innsbruck, both of Austria

[73] Assignee: D. Swarovski & Co., Wattens, Austria

[21] Appl. No.: 303,018

[22] Filed: Sep. 17, 1981

[30] Foreign Application Priority Data

Oct. 9, 1980 [DE] Fed. Rep. of Germany ....... 3038188

[51] Int. Cl.3 ......................... B32B 3/16; B32B 15.04; C09J 7/02

[52] U.S. Cl. .................................... 428/200; 156/233; 156/240; 156/313; 427/148; 427/208; 427/208.2; 428/209; 428/344; 428/347; 428/353; 428/354; 428/913; 428/914

[58] Field of Search ............... 156/233, 234, 240, 241, 156/313; 427/148, 209, 435, 208, 208.2; 428/200, 209, 344, 347, 349, 353, 354, 913, 914

[56] References Cited

U.S. PATENT DOCUMENTS

| | | | |
|---|---|---|---|
| 2,304,263 | 12/1942 | Lüty | 156/313 |
| 3,770,570 | 11/1973 | Swearingen et al. | 428/209 |
| 4,275,116 | 6/1981 | Kratschmer | 428/344 |

FOREIGN PATENT DOCUMENTS

| | | | |
|---|---|---|---|
| 2139144 | 1/1973 | France | 428/344 |

*Primary Examiner*—Bruce H. Hess
*Attorney, Agent, or Firm*—Sandler & Greenblum

[57] ABSTRACT

Small decorative plates for ornamental use, in particular for the decoration of textiles having an effective inner layer with at least one metallic layer, and two thermically activatable melt adhesive layers forming the outer layers on both sides.

11 Claims, 1 Drawing Figure

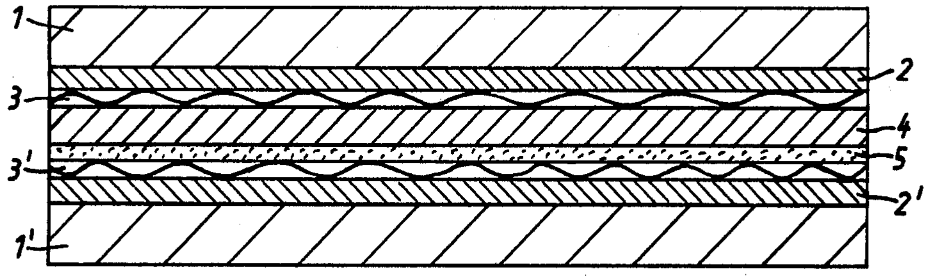
1
2
3
4
5
3'
2'
1'

SMALL DECORATIVE PLATES

BACKGROUND OF THE INVENTION

1. Field of the Invention

The invention concerns small decorative plates for ornamental use, in particular for the decoration of textiles.

2. Description of Prior Art

To achieve metallic effects on textiles, printing techniques, embroidery with metallic thread or sewn on sequins had to be resorted to up to now. These techniques, however, require considerable labor and are limited in respect to the scope of aesthetic effects. In addition, textiles that are printed, embroidered or provided with sequins are not satisfactory in regard to durability and washability.

The invention is based on the problem of providing small decorative plates which are particularly suitable for application to textiles to achieve metallic effects and are characterized by their ease of application and their durability.

SUMMARY OF THE INVENTION

This problem is solved by a small decorative plate for ornamental use, in particular for the decoration of textiles, which is characterized in that it comprises an effective inner layer having at least one metallic layer, and two thermally activatable melt adhesive layers forming the outer layers on both sides.

Surprisingly enough, it has been shown that even extremely thin metal layers in connection with melt adhesive layers and further layers, if any, yield a decorative material with which particularly textiles can be provided to achieve unexpected metallic effects greatly superior aesthetically to the known techniques.

In addition, the small decorative plates can be applied to the textile in a simple way, i.e. by ironing or hot-pressing. The secure bond achieved by the melt adhesive layer between the small decorative plates and the textile allows for excellent durability and washability.

A further essential advantage is the ease of application, since the small plates are always in the right position due to the melt adhesive layer on both sides, whereas they could also be applied upside down if only one melt adhesive layer were present.

The small decorative plates can be used in a great variety of forms. For example, they can be applied to the textile in the form of dots or circles or other geometrical forms such as triangles, squares and stars, whereby several elements such as these are arranged ornamentally. The ornamental arrangement of the various elements can be realized in certain forms. A random distribution, however, as obtained by being strewn onto the textile, can also be selected. It is also possible to apply the small decorative plates in complicated, aesthetically attractive forms and shapes. They are extremely well suited to achieve similar effects to sequins, whereby the small plates can be considerably smaller than sequins, if desired. Sequins are usually limited to a diameter of 6 mm, whereas the small plates according to the invention can be as small as 1 to 2 mm.

The small decorative plates can be given a great variety of aesthetic effects by their construction and coloration.

The small decorative plates are particularly well suited for the decoration of textiles such as material, dresses, blouses, etc. However, they can also be used for other materials and objects such as leather, metal objects, synthetic objects, buttons, tins, glasses, etc.

BRIEF DESCRIPTION OF THE DRAWING

The FIGURE is a schematic cross-sectional view of the invention.

DETAILED DESCRIPTION OF THE PRESENT INVENTION

The melt adhesive layer can be composed of all known melt adhesives which ensure good adhesion between the decorative material and the objects to which it is to be applied. Examples of appropriate melt adhesives are polyamides, polyvinyl acetate, polyester resin, epoxy resin, isocyanate and aminoplastics. Melt adhesives on the basis of thermoplastic polyamide resins are especially suitable. The thickness of the melt adhesive layer can be varied within wide limits according to the application at hand. It is preferably in the range of 20 to 100$\mu$ and especially of 50 to 80$\mu$.

The effective layer of the small decorative plates refers to the layer or rather group of layers giving the small plates their aesthetically desirable appearance. These are in particular the metal layer or a metalized layer on a synthetic film and additional layers of varnish, if any.

The metal layer consists chiefly of a metalized layer. The production of this type of coating of metal, metallic oxide or metal salt, which can take place, for example, by thermic evaporation in a vacuum, electron beam sputtering or cathodic sputtering, is known. For example, these metalized layers are used for glass bricks. These layers are generally very thin and have a size in the range of 0.5 to 5$\mu$, especially 1 to 2$\mu$. By using suitable materials and/or a multi-layer vaporization the metalized layer can be given a certain color, i.e. in particular the characteristic interference colors. Particular aesthetic effects can be obtained by this design of the decorative material. It is also possible to provide the metalized layer with a colored layer of varnish on a colored synthetic film for coloration.

Alternatively, the metal layer can consist of an aluminum layer or aluminum foil. The strength of the layer is generally between 5 and 30$\mu$, especially around 20$\mu$. Another color can be given to the aluminum layer by applying a colored vvarnish, laminating a synthetic film on, applying a metalized layer or anodizing with the addition of color.

The metallic layer can also be provided on both sides with a layer of varnish. Epoxy varnishes, which can be colorless or colored, are especially suited for varnishing. The layer of varnish cannot be thermally activatable, i.e. it must not be damaged when the melt adhesive layer is activated.

The small decorative plates have a melt adhesive layer on both sides as their outer layers. This has the advantage that the material can be connected with the object that is to be decorated in any position. The small plates are thus particularly well suited to being strewn on.

The small plate also comprises preferably a heat-resistant and nondeformable synthetic film. The heat-resistance must be sufficiently high that the synthetic film is not damaged and retains its shine when the melt adhesive layer is activated. The nondeformability is important because the structure of the fabric should not be pierced when the decorative material is applied to the textile. This function of the synthetic film can also be fulfilled by an aluminum foil. The synthetic film can be transparent or colored, for example, yellow, in order to achieve a golden effect. A polyester film is chiefly used as a synthetic film, preferably with a thickness between 10 and 30μ. If desired, thicker films up to 100μ thick can however also be used.

The entire thickness of the small decorative plates is generally selected to be as thin as possible in order to have as little adverse effect on the properties of the textile and thus its wearing properties as possible.

The construction of a small decorative plate having the above-mentioned thermally stable synthetic film or synthetic layer is in the most simple embodiment: synthetic film, metallic layer, with a layer of varnish on one or both sides, if desired, and an outer melt adhesive layer on both sides.

The synthetic film is preferably vaporized with the metallic layer during production and then a melt adhesive film is laminated onto both sides.

Priming layers can be present between the various layers, if desired, especially contributing to a stronger bond between the layers.

A suitable small decorative plate according to the invention can have the following construction, for example: Melt adhesive layer (70μ), priming layer (2μ), varnish layer (1μ), synthetic film (20μ), metalized layer (1μ), varnish layer (1μ), priming layer (2μ), melt adhesive layer (70μ).

The preferred embodiment stated above is shown in the figure. The synthetic film 4 bears the metalized layer 5 and varnish layers 3,3' are provided on both sides. The priming layers 2,2' are present to provide a better bond between the layers. The outer layers are the two melt adhesive layers 1,1'.

The small decorative plates according to the invention are produced preferably in the form of a film. The single small plates can then be punched or cut out of this film. The small plates or other geometrical forms can be used as such for decorative purposes. However, it is advantageous for many types of application to arrange the single elements on an adhesive film and then combine them with a cover film. The cover film is removed for application and the adhesive film with the various decorative elements adhering to it is then laid onto the textile that is to be decorated. The subsequent ironing or hot-pressing process activates the melt adhesive layer and joins the small decorative plates to the textile. Finally, the adhesive film is removed. As the small plates are enclosed on both sides by a melt adhesive layer, the upper melt adhesive layer is also combined at the edges with the textile during application, allowing for a particularly stable bond and particular durability and washability.

Due to the great range of possibilities of variation mentioned of the small decorative plates according to the invention, aesthetic effects can be obtained with them that are unattainable with the techniques customary up to now.

What is claimed is:

1. A decorative plate for ornamental use comprising first and second thermally activatable melt adhesive layers and a metal layer comprising a metalized layer on a synthetic film, said metal layer being positioned between said first and second thermally activatable melt adhesive layers, both of said thermally activatable melt adhesive layers being exposed on one side.

2. A decorative plate according to claim 1 wherein said metal layer comprises aluminum.

3. A decorative plate according to claim 1 or 2 wherein said metal layer further comprises a layer of varnish on at least one side of said metal layer.

4. A decorative plate for ornamental use comprising first and second layers of varnish, a metalized layer, a heat-resistant synthetic film vaporized onto one side of said metalized layer, said metalized layer and heat-resistant synthetic film positioned between said first and second layers of varnish, first and second priming layers and first and second thermally activatable melt adhesive layers, said priming layers being positioned between said layers of varnish and said thermally activatable melt adhesive layers, and said thermally acctivatable melt adhesive layers being exposed on one side.

5. A decorative plate for ornamental use comprising first and second thermally activatable melt adhesive layers, and a metal layer having a layer of varnish on at least one side, said metal layer being positioned between said first and second thermally activatable melt adhesive layers, both of said thermally activatable melt adhesive layers being exposed on one side.

6. A decorative plate according to claim 5 wherein said metal layer comprises a metalized layer on a synthetic film.

7. A decorative plate according to claim 5 wherein said metal layer comprises aluminum.

8. A sheet for applying a plurality of decorative plates comprising an adhesive film having detachably connected thereon said plurality of decorative plates, each of said plurality of decorative plates comprising first and second thermally activatable melt adhesive layers, and a metal layer positioned between the first and second thermally activatable melt adhesive layers.

9. A sheet according to claim 8 wherein each of said decorative plates comprises a metalized layer on a synthetic film.

10. A sheet according to claim 8 wherein each of said decorative plates comprises aluminum.

11. A sheet according to claim 8, further comprising a cover film, said cover film being detachably connected to said adhesive film, such that said plurality of decorative plates are located between said adhesive film and said cover film, said cover film being removable prior to the application of said plurality of decorative plates.

* * * * *